Feb. 8, 1938.    G. A. LYON    2,107,336
HINGED TIRE COVER FOR USE WITH FENDERWELL
Filed Jan. 2, 1932    3 Sheets-Sheet 1
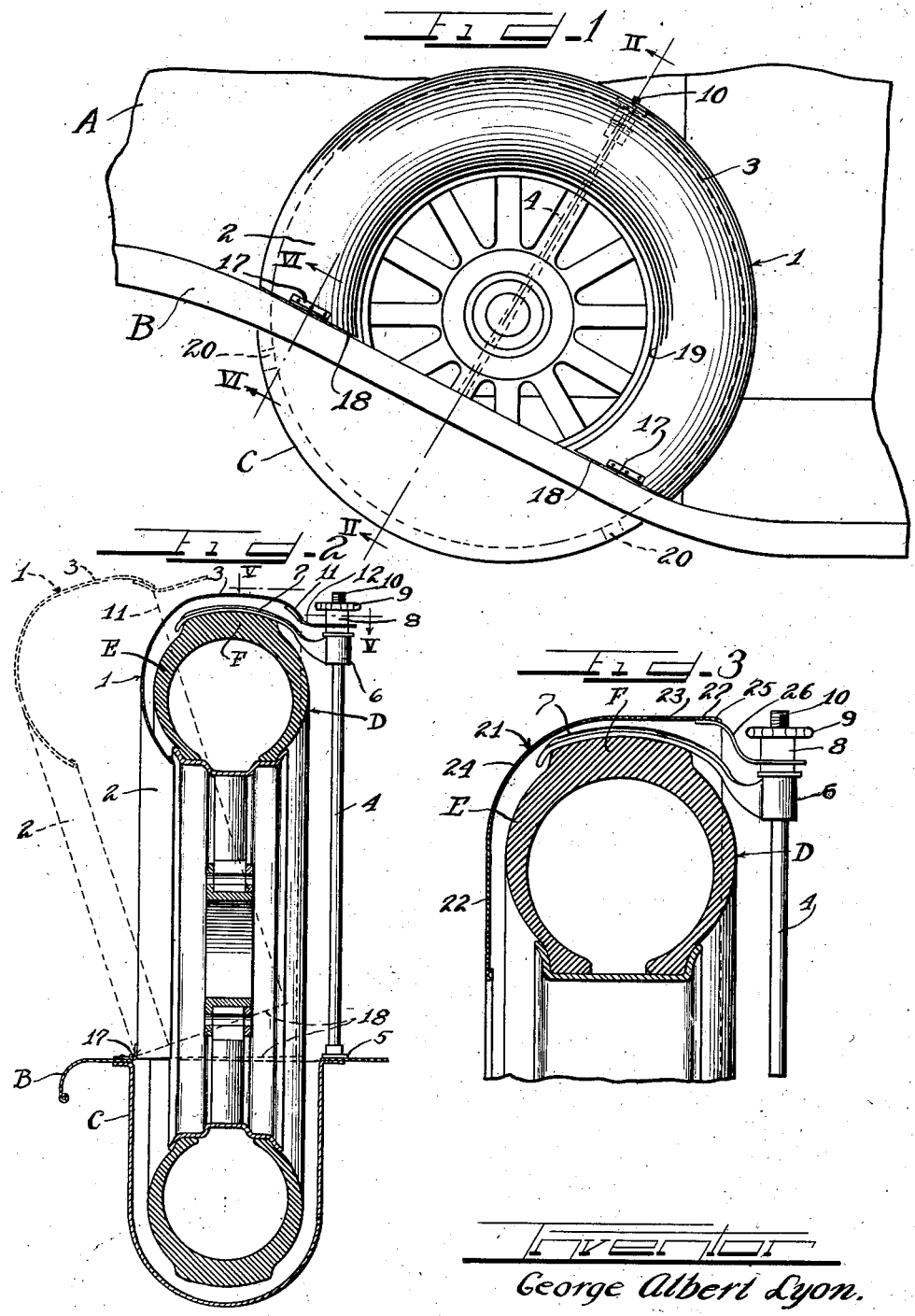
Inventor
George Albert Lyon.
by Charles Wills
Attys.

Feb. 8, 1938.  G. A. LYON  2,107,336
HINGED TIRE COVER FOR USE WITH FENDERWELL
Filed Jan. 2, 1932  3 Sheets-Sheet 2
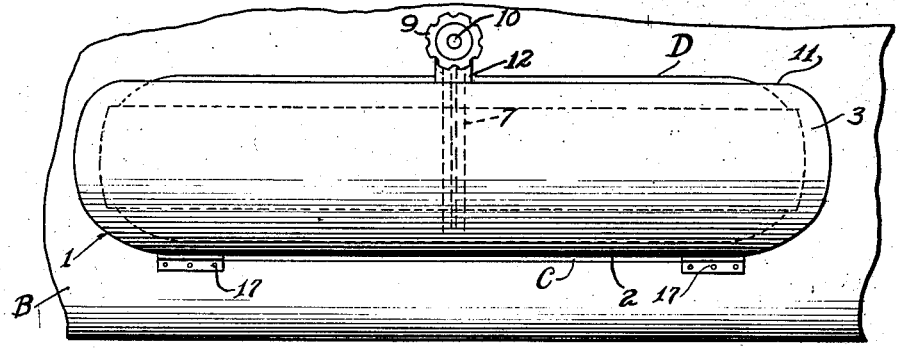
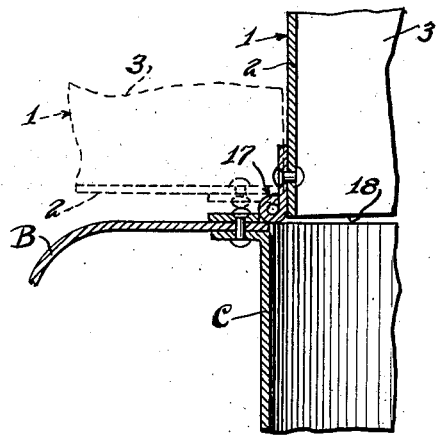
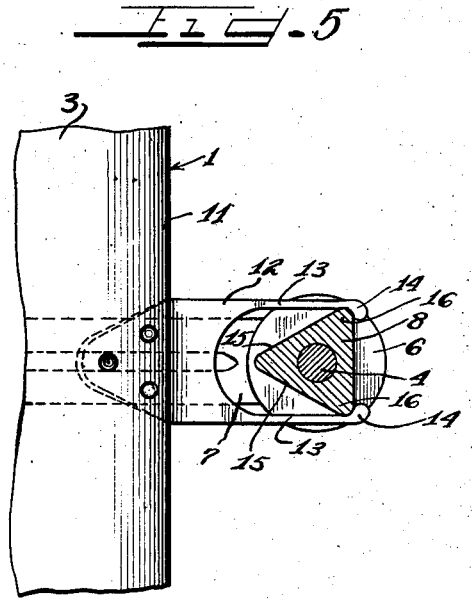
Inventor
George Albert Lyon.
by
Attys.

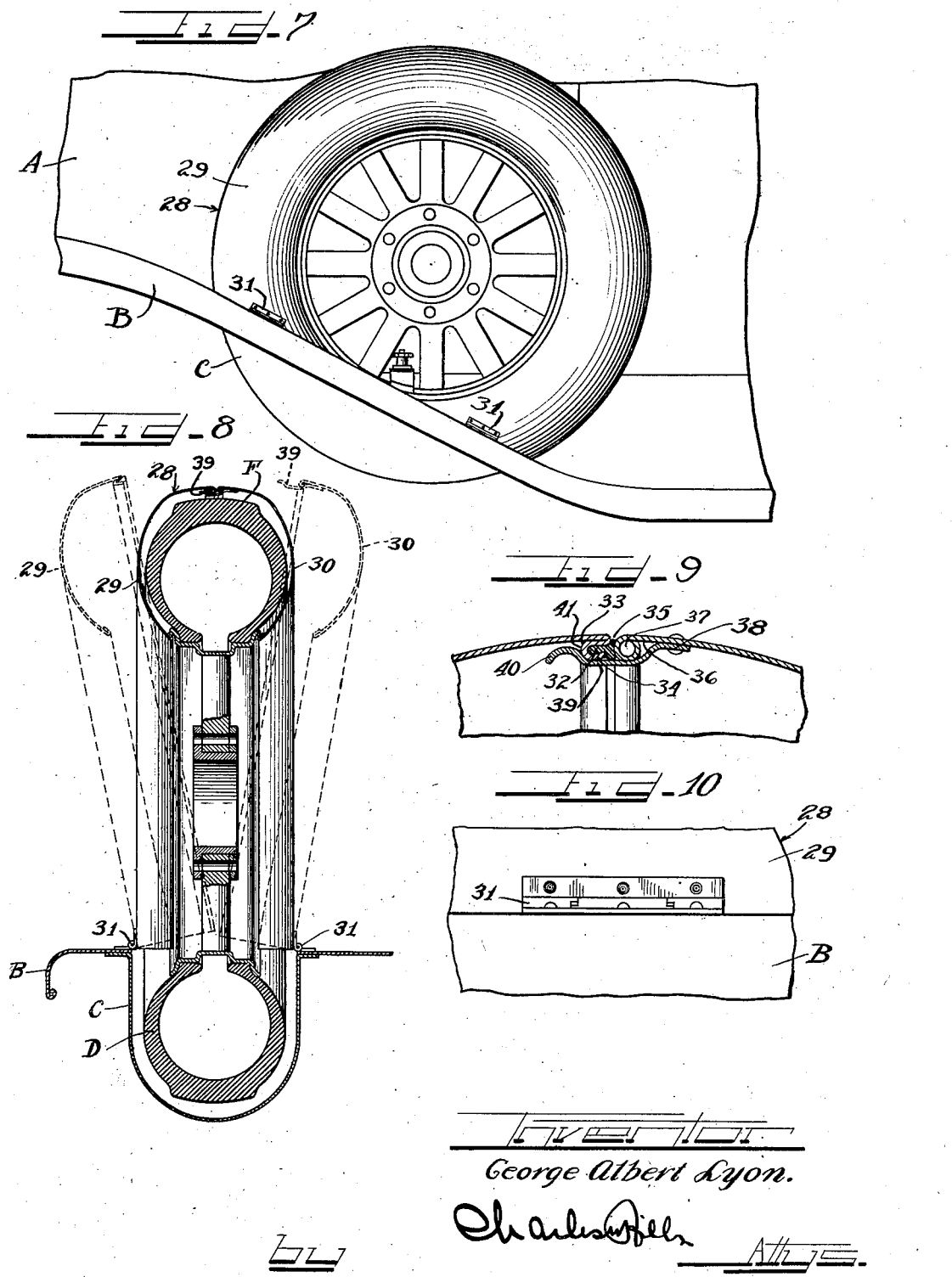

Patented Feb. 8, 1938

2,107,336

UNITED STATES PATENT OFFICE 2,107,336

HINGED TIRE COVER FOR USE WITH FENDERWELL

George Albert Lyon, Allenhurst, N. J., assignor to Lyon Incorporated, Asbury Park, N. J., a corporation of Delaware Application January 2, 1932, Serial No. 584,552

3 Claims. (Cl. 224—29)

This invention has to do with tire covers for use with automobile fenderwells and more particularly with a hinged tire cover of this character.

It is one of the objects of this invention to provide a tire cover of this character which, in its application to and removal from a spare tire carried in a fenderwell, is moved transversely of the tire and may be shoved thereover in proper tire protecting position.

It is a further object of the invention to provide a tire cover of this character which is hingedly connected to the fenderwell and may be moved to an inoperative position in which it will not interfere either with the application or removal of the spare tire.

Another object of the invention consists in the provision of a tire cover of this character in combination with means disposed on opposite sides of an automobile fenderwell for detachably holding the cover securely in tire covering position.

Another object of the invention resides in the provision of a tire cover connected to a fenderwell in such a manner that it is movable transversely of the spare tire in the well, the construction being such as to permit the cover to be swung in its application to and removal from the tire.

It is another object of the invention to provide in a device of this character, a multi-part cover having its sections hingedly connected to a fender in the form of a clam shell and likewise movable into and out of tire covering position, including means for cushioning the meeting edges of the sections and preventing rattling thereof, and a connection which is automatically effective when the sections are brought together to detachably hold the same in proper position on a spare tire.

Further important objects and advantages of the invention will appear as the description proceeds.

In accordance with the general features of the invention, there is provided a sheet metal tire cover either in one section or in a plurality of sections, pivotally connected to a fender adjacent the fenderwell in such a manner that it is movable transversely of the spare tire contained in the well in the application of the cover to and removal from proper tire protecting position. In whatever form the invention may take, the construction is such that it will not in any way interfere with the locking means which may be provided in locking the spare tire in the fenderwell. In accordance with one form of the invention, a single section is hingedly secured to a fender at the outer rim of the well and is swung transversely of the spare tire, means being provided whereby the cover is held in place by a spring catch or the like as it is swung into position. In this form of the invention, the tread covering portion of the cover may be crowned transversely to conform generally with the curvature of the outer portion of the tire, or the outer rim portion of the cover may be straight, the latter construction permitting of a closer fit of the cover about the tire. In accordance with another form of the invention, the cover is constructed of a pair of clam shell-like sections hinged at opposite sides of a fenderwell and capable of limited separation to allow insertion of a spare tire into and its removal from the well, and having anti-rattling means and in addition a catch which automatically secures the sections together when they are swung into proper tire protecting position.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary elevational view of an automobile and fenderwell, showing a tire cover constructed in accordance with one form of the invention secured in tire protecting position.

Figure 2 is a sectional view taken approximately in the plane indicated by the line II—II in Figure 1, dotted lines being added to show the swinging action of the cover.

Figure 3 is an enlarged fragmentary sectional view of a somewhat modified form of cover construction.

Figure 4 is a fragmentary plan view of the form of the invention appearing in Figures 1 and 2.

Figure 5 is a fragmentary sectional view taken approximately in the plane indicated by the line V—V in Figure 2.

Figure 6 is an enlarged fragmentary sectional view taken approximately in the plane indicated by the line VI—VI in Figure 1.

Figure 7 is a fragmentary elevational view of an automobile provided with a fenderwell, showing a modified form of tire cover in tire protecting position.

Figure 8 is an enlarged fragmentary vertical sectional view of the modified structure shown in Figure 7, dotted lines being added to show the pivotal action of the tire cover sections.

Figure 9 is an enlarged fragmentary sectional view showing details of construction of the meeting edge portions of the tire cover sections and the releasable holding means therefor.

Figure 10 is an enlarged fragmentary elevational view showing the hinged connection between the fender and the cover.

Referring now more particularly to the drawings, wherein the same parts are designated throughout by the same reference characters, the automobile body A is illustrated as being provided with a fender B having a well C in which a spare tire D is received. The invention forming the subject matter herein may be exemplified in various tire cover constructions, so that the forms herein depicted are to be understood as illustrative modifications of the invention.

In accordance with one form of the invention, the tire cover comprises an arcuate shell 1 of preferably greater circumferential extent than 180° and, with the fenderwell C, embracing substantially 360°. The shell 1 comprises a side portion 2 for concealing the outer side wall E of the spare tire D, exposed above the fenderwell C, and a rim portion 3 for covering and protecting the exposed tread F of the tire D. The tire D may be held in position in the well C by any suitable means to prevent rattling of the tire, such as the post 4 secured at its lower end at 5 to the fender B and having at its upper end a sleeve 6 provided with a clamping extension 7 extending across and in engagement with the tread F of the spare tire D. A triangular sleeve part 8 either secured to or separate from the sleeve 6 fits around the post 4 at the upper end thereof and is forced downwardly together with the sleeve 6 by the handwheel 9 which is threaded to the upper end of the post 4 at 10. The free longitudinal marginal portion 11 of the tread covering rim 3 has secured thereto, at a point which is juxtaposed to the post 4 when the cover is in tire protecting position, a spring catch 12 which is bifurcated to provide resilient fingers 13. The fingers 13 are provided with rounded noses 14 which, during the completion of the swinging movement of the cover 1, engage the sides 15 of the triangular part 8 and are cammed outwardly by the latter until they snap over the corners 16 to occupy the positions shown clearly in Figure 5.

When the fingers 13 are positioned as shown in Figure 5, the cover 1 is in proper tire protecting position, the cover being so hinged at 17 to the fender B adjacent the well C that the edges 18, cooperating with the well C, are slightly spaced therefrom. Thus it will be appreciated that the cover is entirely free of the fender and well so that rattling and an improper fit are inhibited. If desired, suitable gasket means may be interposed between the fender and the edge 18 of the cover 1 in order to further insure against rattling and prevent entry of foreign matter into the well C.

While it has been stated that the triangular part 8 may be either secured to or separate from the sleeve 6, it is preferred that these parts be secured to each other so that when the clamping extension 7 is placed in clamping position as shown, the sides 15 of the part 8 will be arranged in proper position to cam the spring fingers 13 apart and allow the noses 14 thereof to snap over the corners 16 of the part 8 as hereinabove described. It will be understood that the catch herein described is illustrative of any number of devices of the same general character for accomplishing the desired results.

The tire D may be allowed to rest upon the bottom of the well C or, if desired, yieldable pads of any suitable character as shown at 20 in Figure 1 may be provided for direct engagement with the tread F of the tire D and for spacing the same from the bottom of the well C.

It will be noted that the side and rim portions 2 and 3, respectively, of the cover 1 are transversely curved to conform generally with the corresponding curvature of the tire D, and are so constructed as to clear the clamping extension 7 as the cover is swung transversely from its open position as shown in dotted lines in Figure 6 to its closed position as shown in Figures 1, 2, 4, 5 and 6 in full lines. It will be apparent from the foregoing that the tire cover 1 may be readily applied to the spare tire in proper position, the operation of placing the cover in this position and securing the same, or of withdrawing the same, being performed entirely by one movement.

A somewhat modified form of the invention is illustrated in part at 21 in Figure 3, and comprises straight side and rim portions 22 and 23, respectively, for disposition in protecting relation to the exposed outer side wall E and the tread F of the spare tire D carried in a fenderwell, the portions 22 and 23 being preferably rounded at their juncture 24. The radially outer peripheral edge portion 25 of the cover is so arranged as to permit the remaining portion of the rim 23 to fit more closely to the tread F of the tire D and so that, in the swinging movements of the cover 21, said edge will clear the tread of the tire. In substantially all other respects, the covers 1 and 21 and associated structure are identical, the spring catch 26 secured to the marginal portion 25 at 27 cooperating with the triangular part 8 in the form of the invention shown in Figure 3 in the same manner as the catch 12 in the other form of the invention.

In moving the cover 1 or the cover 21, as the case may be, into non-protecting position, it is necessary merely to grasp the marginal portion 11, 27, thereof and impart a sudden pull or yank thereto in a direction transversely of the spare tire D and away from the body A. This force will cause the noses 14 of the spring arms 13 of the catch 12 to be cammed apart by the rounded corners 16 of the triangular part 8, thus allowing the noses 14 to pass beyond said corners and leaving the cover free to be swung about its hinges 17 to an uncovering position.

The invention may take another form as shown in the remaining figures of the drawings, as exemplified in the tire cover 28, which comprises a pair of oppositely disposed swingable hollow clam shell-like parts 29 and 30, toroidal in form, each covering, when in closed position, substantially one-half of that portion of the spare tire which projects upwardly from the fenderwell in which it rests, and being hinged at 31 at its bottom to the fender at one longitudinal rim of the well. The cover part 30, it will be noted, lies between the spare tire D and the body A of the automobile, and is thus limited in its separative movement to the position shown at 30 in dotted lines in Figure 8. This movement is however sufficient to permit without interference the removal and application of the spare tire D with respect to the fenderwell C, when the complemental part 29 is moved a like amount, or, as is preferably, is shifted about its hinge 31 to a substantially horizontal position. In order to prevent rattling between the marginal edges of the cover parts 29 and 30, a cushioning bead or gasket 32 is interposed therebetween. The bead 32 is crimped and tightly secured in the return bent margin 33 which is turned up at 34 to provide a rounded cam surface, a portion of the bead 32 projecting beyond the margin 33 as shown at 35. The other cover part 30 has its margin 36 curled inwardly to provide a smooth abutting ridge or edge 37 which is engageable throughout its length with the projected portion 35 of the bead 32. Secured at 38 to the part 30 adjacent the ridge 37 is a spring catch or latch 39 having a rounded nose 40 which, when the parts 29 and 30 are brought together, is cammed downwardly by the rounded cam portion 34 of the margin 33 until it passes beyond said cam portion and, by its resiliency, engages the rear portion 41 of the margin 33 and thereby resiliently holds the two parts tightly together with the protruding portion 35 of the gasket 32 in substantially tight engagement with the rounded edge 37 of the part 30. The cover parts are thereby effectively held from rattling and also from accidental separation. It will be appreciated that while only one catch or latch 39 is herein illustrated, as many such devices as may be desired may be incorporated in the construction without in the least departing from the spirit and scope of the invention. Moreover, the anti-rattling means and arrangement of parts may be reversed with respect to the construction shown and described, as may also the latch 39, and these parts may also be varied in construction to produce the desired results.

In separating the parts 29 and 30, it is necessary to exert merely sufficient separating force to cam the nose 40 of the latch 39 downwardly out of engagement with the rear portion 41 of the margin 33 of the part 29. This may be done by pressing substantially radially on the parts 29 and 30 and then forcing them apart by the frictional hold of the hands on the parts. Or, if desired, any tool such as a screw driver or a coin may be inserted in the space 42 between the marginal portions of the cover parts 29 and 30 and twisted to cause the desired separative movement of the parts, so that they may be thereafter freely separated to allow application or removal of the spare tire D.

The parts 29 are preferably formed to simulate in cross section the shape of the spare tire, and provide a very finished and neat appearance. It will be understood, however, that if desired the side and rim portions of the parts 29 and 30 could be shaped similar to the side 22 and rim portion 23 of the cover 21 shown in Figure 3, if such a shape were found desirable.

It will be seen from the foregoing that each of the covers constructed in accordance with the present invention are of extremely neat appearance and sturdily constructed of sheet metal or other suitable material, are readily moved into and out of proper tire protecting position by a single operation, involve a minimum of parts whereby their manufacture is greatly simplified and reduced in cost, and are susceptible of receiving any desired ornamentation by which they and the automobiles in connection with which they are used have a distinct esthetic appeal.

In the appended claims, the expression "tire axis" refers to the central axis about which the tire rotates when in use. Also, the expression "outer side of the well" refers to that side of the well which is longitudinally of and remote from the car body.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A spare tire cover construction for a spare tire in a fenderwell, a cover including a side portion for disposition over an outer side wall of the tire and a tread covering portion for disposition over the tread of the tire, said side portion being hinged to the fender along the outer longitudinal side of the well so as to be swung up and over the tire after the tire has been disposed in the well, and means for pressing the tire downwardly in the well and having a connection to said cover for holding the cover in position on the tire.

2. A spare tire cover construction for a spare tire in a fenderwell, a cover including a side portion for disposition over an outer side wall of the tire and a tread covering portion for disposition over the tread of the tire, said side portion being hinged to the fender along the outer longitudinal side of the well so as to be swung up and over the tire after the tire has been disposed in the well, and means for pressing the tire downwardly in the well and having a connection to said cover for holding the cover in position on the tire, said means including a vehicle supported post in back of the tire having a clamping arm extending between the tire tread and said tread covering portion for holding engagement with the tire.

3. A spare tire cover construction for a spare tire in a fenderwell, a cover including a side portion for disposition over an outer side wall of the tire and a tread covering portion for disposition over the tread of the tire, said side portion being hinged to the fender along the outer longitudinal side of the well so as to be swung up and over the tire after the tire has been disposed in the well, and means for pressing the tire downwardly in the well and having a connection to said cover for holding the cover in position on the tire, said means including a vehicle supported post in back of the tire having a clamping arm extending between the tire tread and said tread covering portion for holding engagement with the tire, and also a connection to said tread covering portion for securing the cover to said post.

GEORGE ALBERT LYON.